(12) United States Patent
Martin et al.

(10) Patent No.: US 7,562,413 B2
(45) Date of Patent: Jul. 21, 2009

(54) COMPACT VEHICLE WASH SYSTEM

(76) Inventors: Jeffrey Martin, 4002 Van Lieshout Rd., Green Bay, WI (US) 54311; Dean Saari, N1962 North Rd., Hortonville, WI (US) 54944

( * ) Notice: Subject to any disclaimer, the term of this patent is extended or adjusted under 35 U.S.C. 154(b) by 0 days.

(21) Appl. No.: 11/588,004

(22) Filed: Oct. 26, 2006

(65) Prior Publication Data
US 2008/0098542 A1 May 1, 2008

(51) Int. Cl.
*B60L 3/06* (2006.01)
(52) U.S. Cl. .......................... 15/97.3; 15/53.1
(58) Field of Classification Search ................. 15/97.3, 15/53.1, 53.2, DIG. 2
See application file for complete search history.

(56) References Cited

U.S. PATENT DOCUMENTS

| | | | | |
|---|---|---|---|---|
| 3,673,626 A | * | 7/1972 | Lieffring | 15/97.3 |
| 3,783,466 A | * | 1/1974 | Bernardi | 15/53.2 |
| 3,795,928 A | * | 3/1974 | Dolitzsch et al. | 15/53.2 |
| 3,931,658 A | | 1/1976 | Evans | |
| 4,009,303 A | * | 2/1977 | Faris | 427/287 |
| 4,056,229 A | | 11/1977 | Jones | |
| 4,057,866 A | | 11/1977 | Belanger | |
| 4,164,053 A | | 8/1979 | Shelstad | |
| 4,173,805 A | | 11/1979 | Silcock | |
| 4,711,257 A | * | 12/1987 | Kobayashi | 134/56 R |
| 4,852,199 A | * | 8/1989 | Holbus | 15/97.3 |
| 4,889,147 A | | 12/1989 | Chandler | |
| 4,998,547 A | | 3/1991 | Klein | |
| 5,098,023 A | | 3/1992 | Burke | |
| 5,148,570 A | | 9/1992 | Crotts et al. | |
| 5,255,695 A | | 10/1993 | Downey | |
| 5,266,123 A | | 11/1993 | Brand | |
| 5,329,949 A | | 7/1994 | Moncourtois et al. | |
| 5,413,128 A | | 5/1995 | Butts | |
| 5,461,745 A | * | 10/1995 | Nittoli | 15/97.3 |
| 5,482,212 A | | 1/1996 | Kobryn et al. | |
| 5,577,288 A | * | 11/1996 | Stinnett et al. | 15/97.3 |
| 5,638,843 A | | 6/1997 | Strickland | |
| 6,277,207 B1 | * | 8/2001 | Gauthier | 134/18 |
| 7,331,079 B2 | * | 2/2008 | Ennis | 15/97.3 |
| 2005/0133071 A1 | | 6/2005 | Brady | |

* cited by examiner

*Primary Examiner*—Dung Van Nguyen
(74) *Attorney, Agent, or Firm*—Joseph S. Heino, Esq.; Patrick M. Bergin, Esq.

(57) ABSTRACT

A vehicle wash system is set forth that comprises a main carriage that is movable along a length of a vehicle that is to be washed and a carriage drive system disposed to move the main carriage along the length of the vehicle. A plurality of nozzles are disposed for co-movement with the main carriage to dispense fluids used in the washing of the vehicle. A sidearm drive system is disposed for co-movement with the main carriage. The sidearm drive system rotates a sidearm cloth in a reciprocating manner for contact with a side portion of the vehicle. To reduce the footprint needed to operate the wash system, the sidearm cloth may be rotated along an arc that is less than 360°. An overhead cloth drive system also may be disposed for co-movement with the main carriage. The overhead cloth drive system may move an overhead cloth in a reciprocating manner for contact with an upper portion of the vehicle.

34 Claims, 8 Drawing Sheets

COMPACT VEHICLE WASH SYSTEM

BACKGROUND OF THE INVENTION

1. Technical Field

The present invention is generally directed to automated vehicle wash systems and, more particularly, to a vehicle wash system having features enabling it to occupy a small footprint, if desired.

2. Related Art

Automated wash systems are employed in both commercial and residential environments to wash a vehicle. The particular configuration of the automated wash system is often dependent on the environment in which it is used. For example, commercial systems may have substantially more area in which to wash a vehicle compared to residential systems and, accordingly, may employ relatively complicated cleaning mechanisms. In such commercial systems, the vehicle may be moved through or parked in a building, such as a garage-like enclosure, as various cleaning processes are performed. The cleaning stations may take various forms including, for example, a pre-soak station, a soap application station, side and overhead brush stations, a rinse station, a liquid polish application station, and a drying station.

Residential wash systems and smaller commercial wash systems may employ brushless wash methods in an effort to reduce the area that such systems occupy. Brushless systems may apply high pressure liquid jet streams to wash the vehicle as the vehicle sits at a stationary location in a garage-like enclosure. The jet streams may be applied to the vehicle in several different manners, depending on design constraints. For example, the jet streams may be applied concurrently over the length of the vehicle by a stationary assembly. Alternatively, the jet streams may be applied by an assembly that moves about the vehicle.

Existing residential wash systems and smaller commercial wash systems are often not as effective at washing a vehicle as their full-size commercial counterparts. High pressure jet stream systems also require complex high pressure liquid delivery systems. Accordingly, improvements in the design and efficiency of such compact systems are needed.

SUMMARY

A vehicle wash system is set forth that comprises a main carriage that is movable along a length of a vehicle that is to be washed and a carriage drive system disposed to move the main carriage along the length of the vehicle. A plurality of nozzles are disposed for co-movement with the main carriage to dispense fluids used in the washing of the vehicle. A sidearm drive system is disposed for co-movement with the main carriage. The sidearm drive system rotates a sidearm cloth in a reciprocating manner for contact with a side portion of the vehicle. To reduce the footprint needed to operate the wash system, the sidearm cloth may be rotated along an arc that is less than 360°. An overhead cloth drive system also may be disposed for co-movement with the main carriage. The overhead cloth drive system may move an overhead cloth in a reciprocating manner for contact with an upper portion of the vehicle.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

Figure 1:
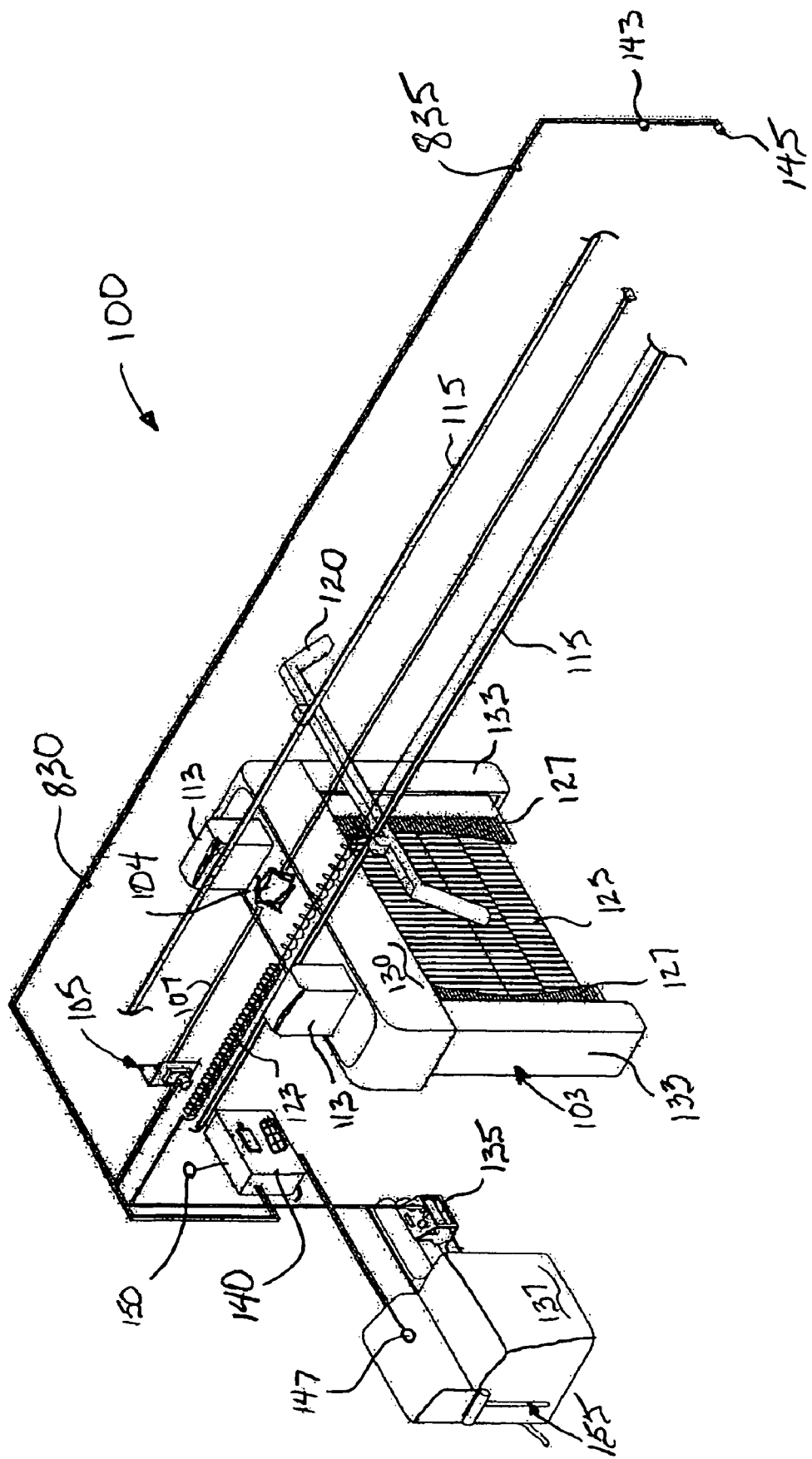
FIG. 1 is a perspective view of one embodiment of a compact vehicle wash system having features enabling it to occupy a small footprint, if desired.

FIG. 1 is a perspective view of a vehicle wash system 100 that may incorporate one or more features rendering it particularly well-suited for use in small footprint environments. In this example, the wash system 100 includes a main carriage 103 that is movable along a length of the vehicle that is to be washed. To this end, the main carriage 103 is engaged with a carriage drive system 105. Although the carriage drive system 105 may be constructed in a variety of different manners, the system shown in FIG. 1 includes a drive assembly 107 that is connected to the main carriage 103 at, for example, a connection member 104, and a drive motor 110 connected to the drive chain 107. The drive assembly 107 may be fixed to an object within the environment of the vehicle wash system 100, such as to a ceiling of a building (i.e., garage or similar structure). An upper portion of the main carriage 103 includes a pair of spaced apart vertical support arms 113 that engage a corresponding pair of parallel guide tracks 115. The configuration of the upper portion of the main carriage 103 may provide an intermediate space between the support arms 113 that prevents interference between the main carriage 103 and, for example, a garage door opener or similar obstructions (not shown).

Figure 2:
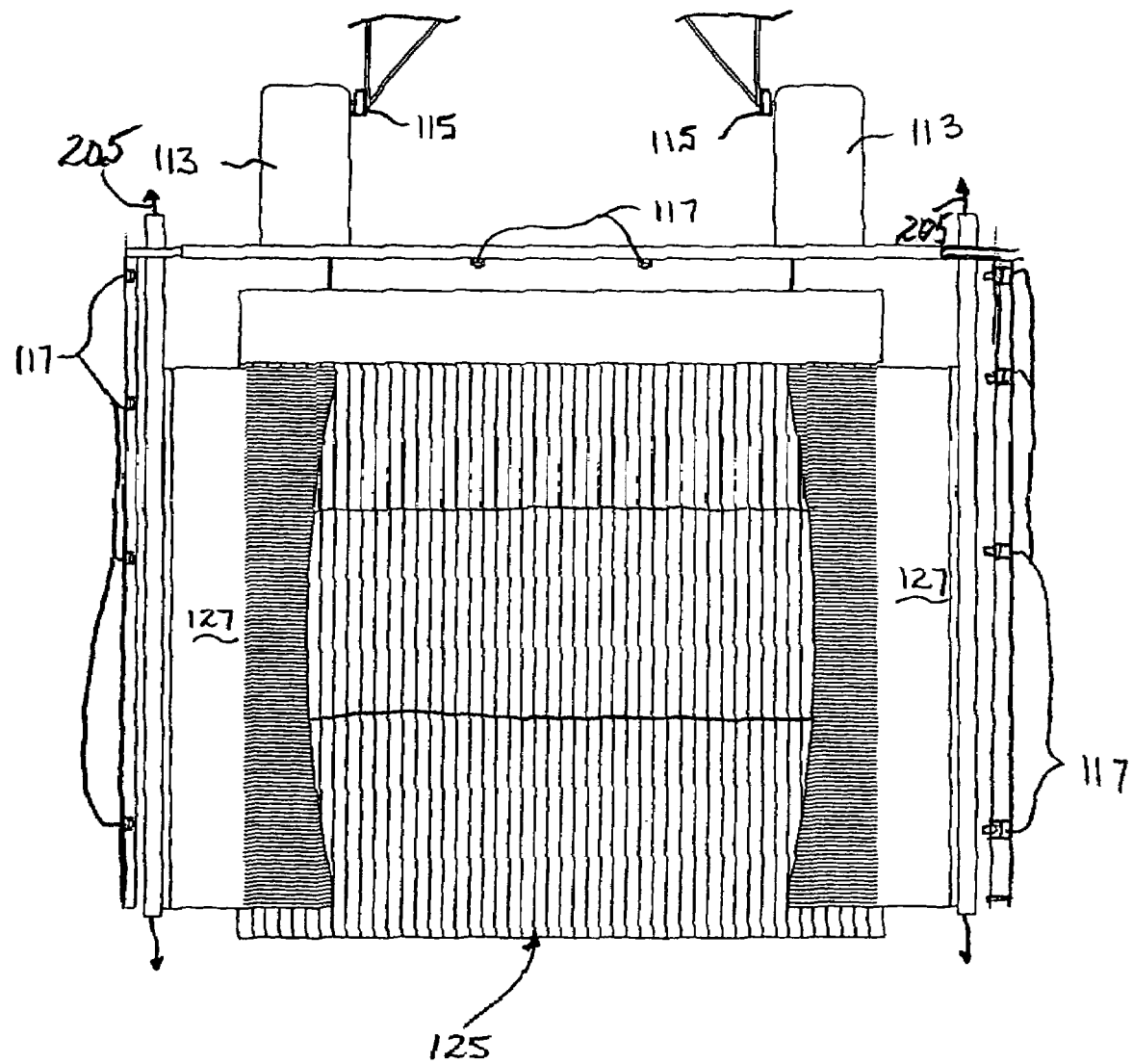
FIG. 2 is a plan view of the main carriage.

A number of components are provided that move along with the main carriage 103 to facilitate washing of the vehicle. As specifically noted in FIG. 2, a plurality of nozzles 117 are provided at the interior facing portions of the main carriage 103 to dispense a fluid, such as a cleaning fluid, a rinsing fluid, a polish or the like, onto the vehicle that is to be washed. In this example, co-movement is provided by integrating the nozzles 117 with the main carriage 103. However, other manners of providing co-movement may be employed.

With reference again to FIG. 1, a rinsing bar 120 likewise is disposed for co-movement with the main carriage 103 to dispense, for example, a pre-soak fluid and/or a rinsing fluid as the main carriage 103 is driven over the length of the vehicle. Fluid is provided to the rinsing bar 120 through a coiled hose 123 or similar distribution mechanism. Co-movement between the rinsing bar 120 and the main carriage 103 may be implemented by connecting the rinsing bar 120 with the carriage drive assembly 103, by connecting the rinsing bar 120 in fixed alignment with the main carriage 103 using an anchor or similar attachment, or by connecting the rinsing bar 120 to the carriage drive assembly 103 using an elastic interconnection between the components. In the illustrated example, co-movement between the rinsing bar 120 and the main carriage 103 occurs in a first direction when the main carriage 103 pushes the rinsing bar 120 as the main carriage 103 moves along a length of the car. The rinsing bar 120 may be driven in a second, opposite direction under the recoil force of the coiled hose 123 or similar method.

One or more overhead cloths 125 as well as one or more pairs of side cloths 127 also are provided for co-movement with the main carriage 103. In the illustrated embodiment, cloths 125 and 127 are each associated with respective drive mechanisms. In turn, the cloths 125 and 127 and their respective drive mechanisms are integrated with the main carriage 103. To this end, main carriage 103 includes an upper housing 130 that cooperates with the vertical support arms 113 to shield and/or support the drive mechanism associated with the overhead cloths 125. A pair of vertically oriented side housings 133 are disposed to shield and/or support the drive mechanisms associated with the side cloths 127.

The system 100 also may include a compressor system 135 that provides pneumatic power to drive its various components. Among the components that are provided with pneumatic power from the compressor system 135 is a plumbing manifold system 137. Either or both the compressor system 135 and/or plumbing manifold system 137 as well as the drives for cloths 125 and 127 may be placed under the control of a programmable logic controller 140 or similar electronic control.

In addition to controlling various components during normal wash cycle operations, the programmable logic controller 140 also may respond to ambient environmental conditions to warn a system user of an alarm event and/or inhibit operation of the system 100 under certain ambient environmental conditions. For example, system 100 may be provided with a sensor 143 that provides a signal indicative of whether an access portal to the enclosure (i.e., garage door or the like) is in an open or closed state. If the sensor 143 indicates that the portal is in an open state, programmable logic controller 140 may inhibit operation of the system 100 until the sensor 143 indicates that the portal is in a closed state. Once the portal is in a closed state, the programmable logic controller 140 may activate an interlock mechanism 145 that prevents the portal from opening until one or more wash cycles have been completed by system 100, or until the occurrence of another appropriate time during the wash cycle.

The wash system 100 also may include one or more temperature sensors. The temperature sensors provide signals indicative of the temperature of the ambient environment in which each sensor is located to the programmable logic controller 140. In the illustrated embodiment, one or more temperature sensors 147 are associated with the plumbing manifold system 137 to monitor the temperature of one or more fluids in the plumbing manifold system 137. Likewise, another temperature sensor 150 may be disposed to monitor the ambient temperature of the wash system environment. When the temperature of a fluid in the plumbing manifold 137 falls below a threshold value as determined by the signal from sensor 147, the programmable logic controller 140 may provide an alarm to the system user thereby warning the user that it may be too cold to execute a wash cycle. Additionally, or in the alternative, the programmable logic controller 140 may prevent execution of a wash cycle when the temperature of the fluid is below the threshold value. Similarly, when the temperature of the ambient environment falls below a threshold value as determined by the signal from sensor 150, the programmable logic controller 140 may provide an alarm to the system user thereby warning the user that it may be too cold to execute a wash cycle. Additionally, or in the alternative, the programmable logic controller 140 may prevent execution of a wash cycle when the temperature of the ambient environment is below the threshold value.

Temperature sensing also allows for execution of protective preemptive measures. For example, compressed air may be provided through one or more lines of the plumbing system through the plumbing manifold 137 to purge fluids from the plumbing system before they freeze and caused damage to the system 100. To this end, a purging operation may be executed when the sensed temperature falls below a predetermined threshold value.

FIG. 1 also shows an optional wand 155. Wand 155 may be connected to receive cleaning fluids, polish, tire cleaner, rinsing fluid, and/or other fluids used during a wash cycle. To increase its cleaning ability, the wand 155 may include a brush at its fluid dispensing end.

Cloths 125 and 127 are each driven in a reciprocating manner. To this end, cloth 125 may be driven back and forth in a direction that is generally parallel with the length of the vehicle that is being washed as the main carriage 103 proceeds along the vehicle. This places the cloth 125 in contact with the front, rear, and/or upper portion of the vehicle as it is being washed. Depending on the length of the cloth 125, side portions of the vehicle also may be contacted and washed by the cloth 125.

Cloths 127 are each driven in a reciprocating manner as they are rotated about respective axes 205. Each cloth 127 may have a contour that generally corresponds to the side contours of a vehicle. The contours of cloths 127 may be generic to a plurality of different vehicles or customized for a single vehicle or set of vehicles. To minimize the overall footprint of system 100, cloths 127 each may be rotated in a reciprocating manner along respective arcs having rotation angles that are less than 360°. Rotation of the cloths 127 in this manner causes the cloths to contact side portions of the vehicle. Depending on the length and contour of each cloth 127, upper and lower portions of the vehicle also may be contacted and washed by the cloths 127.

Figure 3:
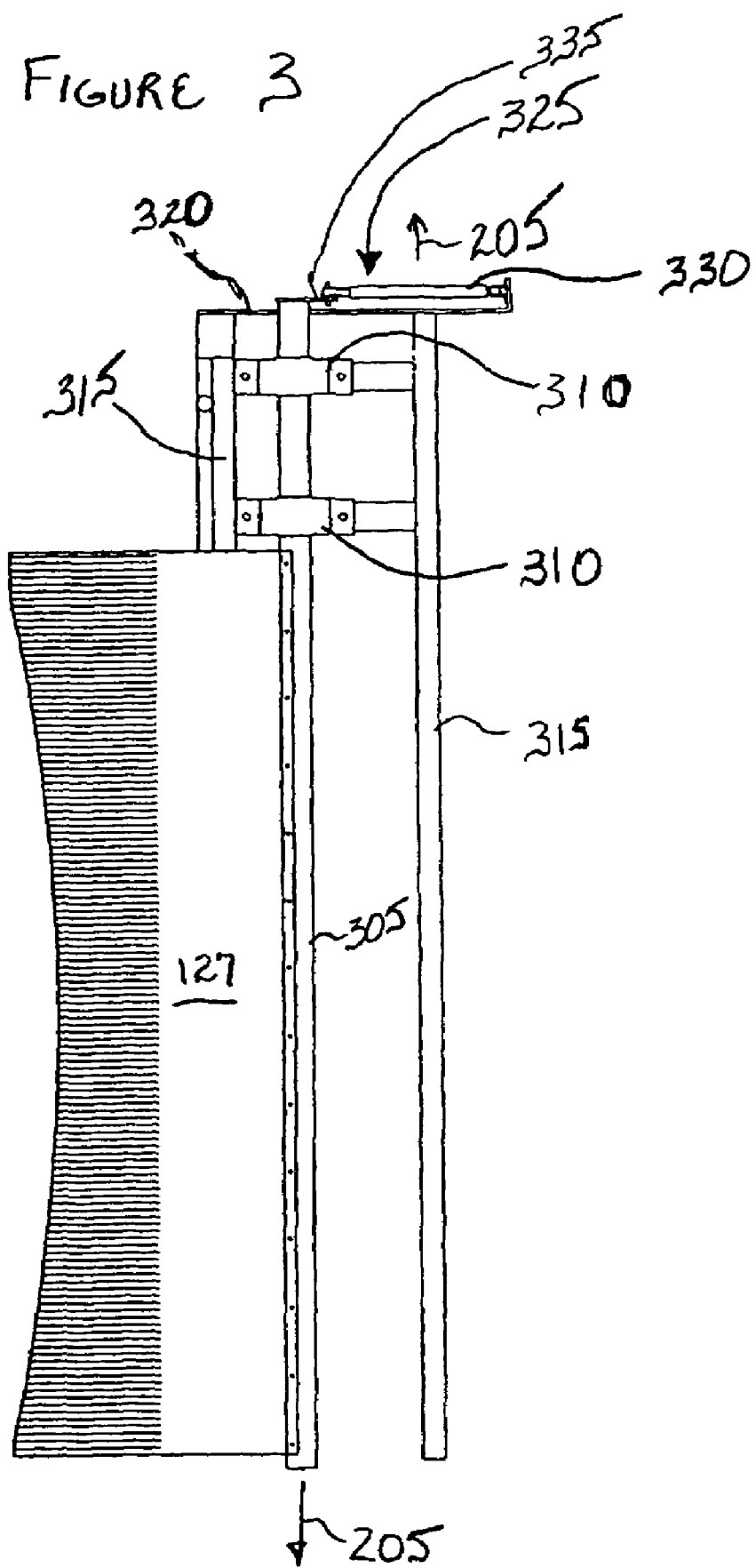
FIG. 3 is a breakout plan view of the sidearm assembly shown in FIG. 1.

FIG. 3 is a partial plan view of a structure that may be used to individually reciprocate each side cloth 127 along a given arc rotation angle. As shown, side cloth 127 is connected for co-rotation with a rod 305. The rod 305 is supported for rotation about axis 205 by a pair of connection members 310 that, in turn, are fixed to the main carriage 103. In the illustrated embodiment, the connection members 310 are supported in fixed alignment with the main carriage 103 by, for example, support members 315. Support members 315 may be connected with one another by one or more transverse brackets 320.

A side cloth drive mechanism 325 may be disposed along a portion of rod 305 to impart the reciprocating rotation to the side cloth 127 under control of the controller 140. Here, the side cloth drive mechanism 325 is disposed at an upper end of the rotatable rod 305 and is in the form of a linear drive 330 that is connected to rod 305 through mechanical linkage 335. The linear drive 330 may be a pneumatic drive that is provided with compressed air from compressor system 135 through one or more valves that are under the control of the programmable logic controller 140. Linkage 335 converts the linear motion of drive 330 to rotational motion of the rod 305.

Figure 4:
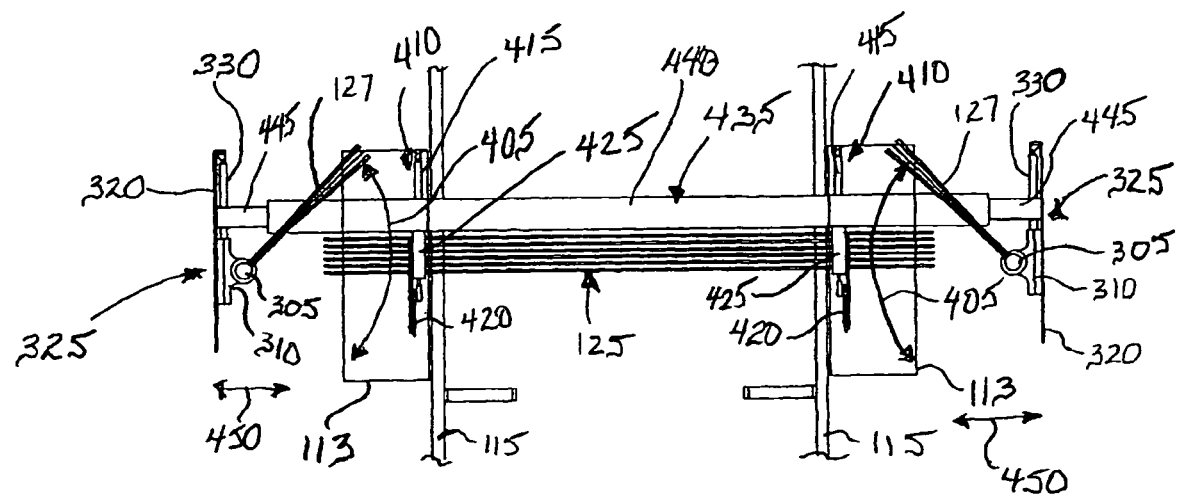
FIGS. 4 and 5 are bottom views illustrating operation of the sidearm assemblies shown in FIG. 1.
Figure 5:
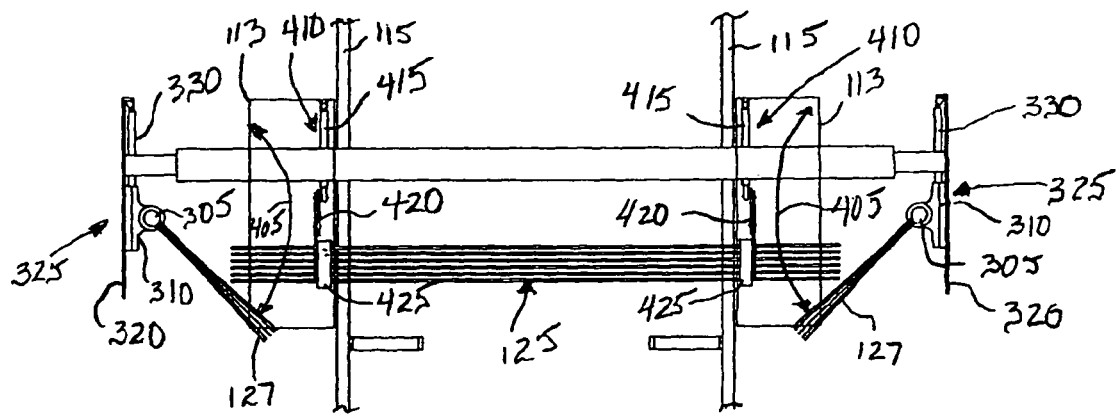

FIGS. 4 and 5 illustrate operation of the side cloth drive mechanisms 325 associated with each of the side cloths 127. FIG. 4 illustrates the side cloth drive mechanisms 325 in a state defining one endpoint for the side cloth rotation about respective arcs 405. FIG. 5 illustrates the side cloth drive mechanisms 325 in a second state defining a second endpoint for the side cloth rotation about their respective arcs 405. The interior angle of each arc 405 may be less than about 360°, and may be less than about 180°. Even further, the interior angle of arc 405 may be less than about 130°, depending on the footprint specifications for system 100.

FIGS. 4 and 5 also show the overhead cloths 125 as they are driven in a reciprocating manner by an overhead cloth drive system. In the illustrated embodiment, the overhead cloth drive comprises a pair of individual drive systems 410 disposed on opposite sides of cloths 125 and shielded by respective housings 113. Each drive system 410 may include a linear drive 415 having a first end fixed to housing 113 and a second end fixed to mechanical linkage 420. The mechanical linkage 420 connects the second end of linear drive 415 to one or more members 425 supporting the overhead cloths 125. The linear drive 415 may be a pneumatic drive that is provided with compressed air from compressor system 135 through one or more valves that are under the control of the programmable logic controller 140. The mechanical linkage 420 may be structured to convert the linear motion of drive 415 to a combined linear and rotational motion of the overhead cloths 125. FIGS. 4 and 5 show potential endpoints for this motion.

System 100 may also include mechanisms to accommodate vehicles of different widths. In the embodiment of the system shown in FIGS. 4 and 5, the side cloths 127 are spaced apart from one another by an adjustable rod assembly 435. The adjustable rod assembly 435 may include a main support rod 440 having hollowed out end portions that engage corresponding coaxial rods 445. Each coaxial rod 445, in turn, engages the structures that support a corresponding side cloth 127. The coaxial rods 445 may each slide in the main support rod 440 in the directions noted by arrows 450 to adjust the spacing between the side cloths 127.

Figure 6:
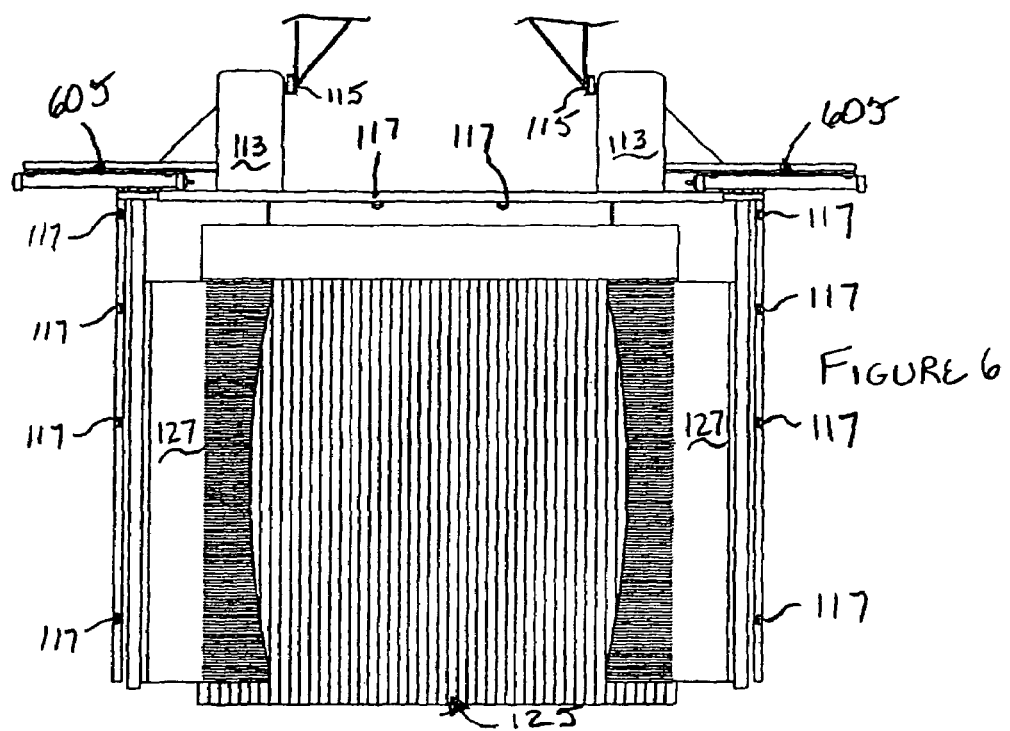
FIGS. 6 and 7 are front plan views of the system shown in FIG. 1 illustrating the width adjustment mechanism.
Figure 7:
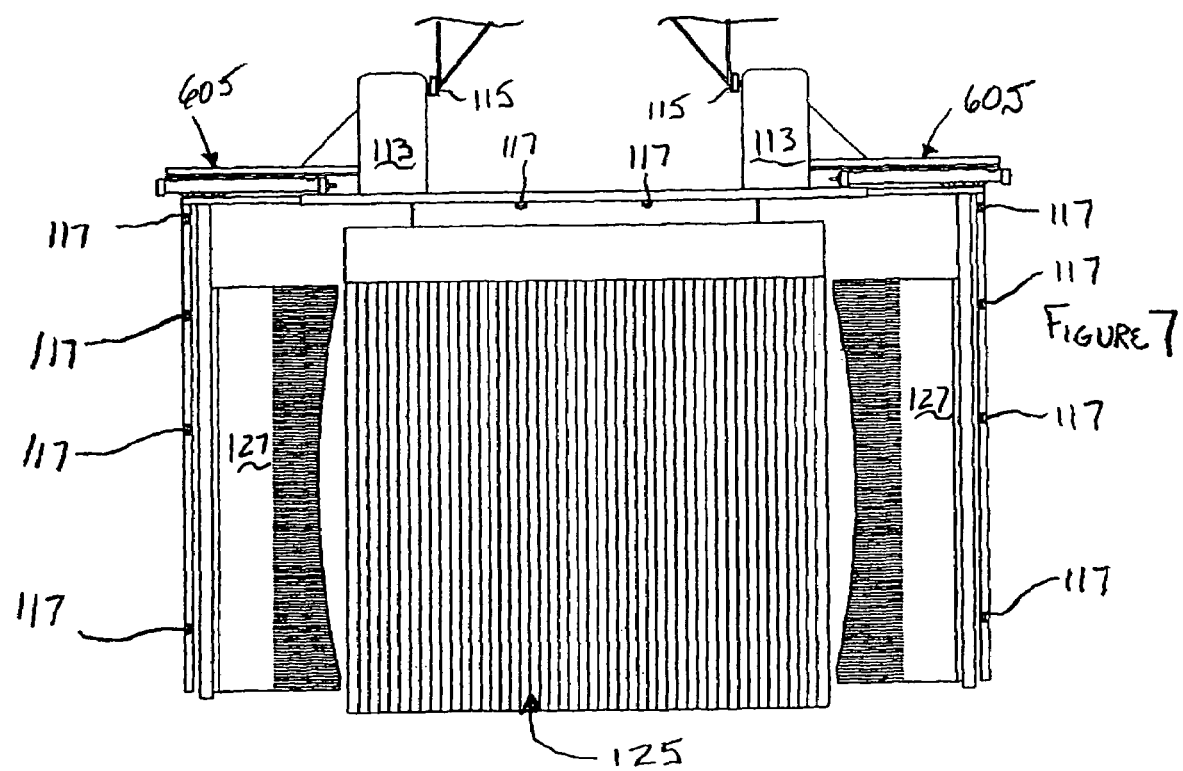

Movement of the coaxial rods 445 with respect to the main support rod 440 may be accomplished manually or automatically. FIGS. 6 and 7 illustrate automated adjustment of the spacing between the side cloths 127. More particularly, an automated adjustment mechanism 605 may be connected to move each coaxial rod 445 in the desired direction. The automated adjustment mechanisms 605 may include one or more pneumatic linear drives of the type described above and may be placed under the control of the programmable logic controller 140. FIG. 6 shows the side cloths 127 spaced apart from one another a sufficient distance to accommodate a narrow body vehicle, while FIG. 7 shows the side cloths 127 spaced apart from one another a sufficient distance to accommodate a wider body vehicle.

The cloths 125 and 127 may comprise any material ordinarily used in commercial car washes. In system 100, the cloths may be reinforced with an underlying polymer material, such as rubber, to provide greater stiffness during the wash cycle.

Figure 8:
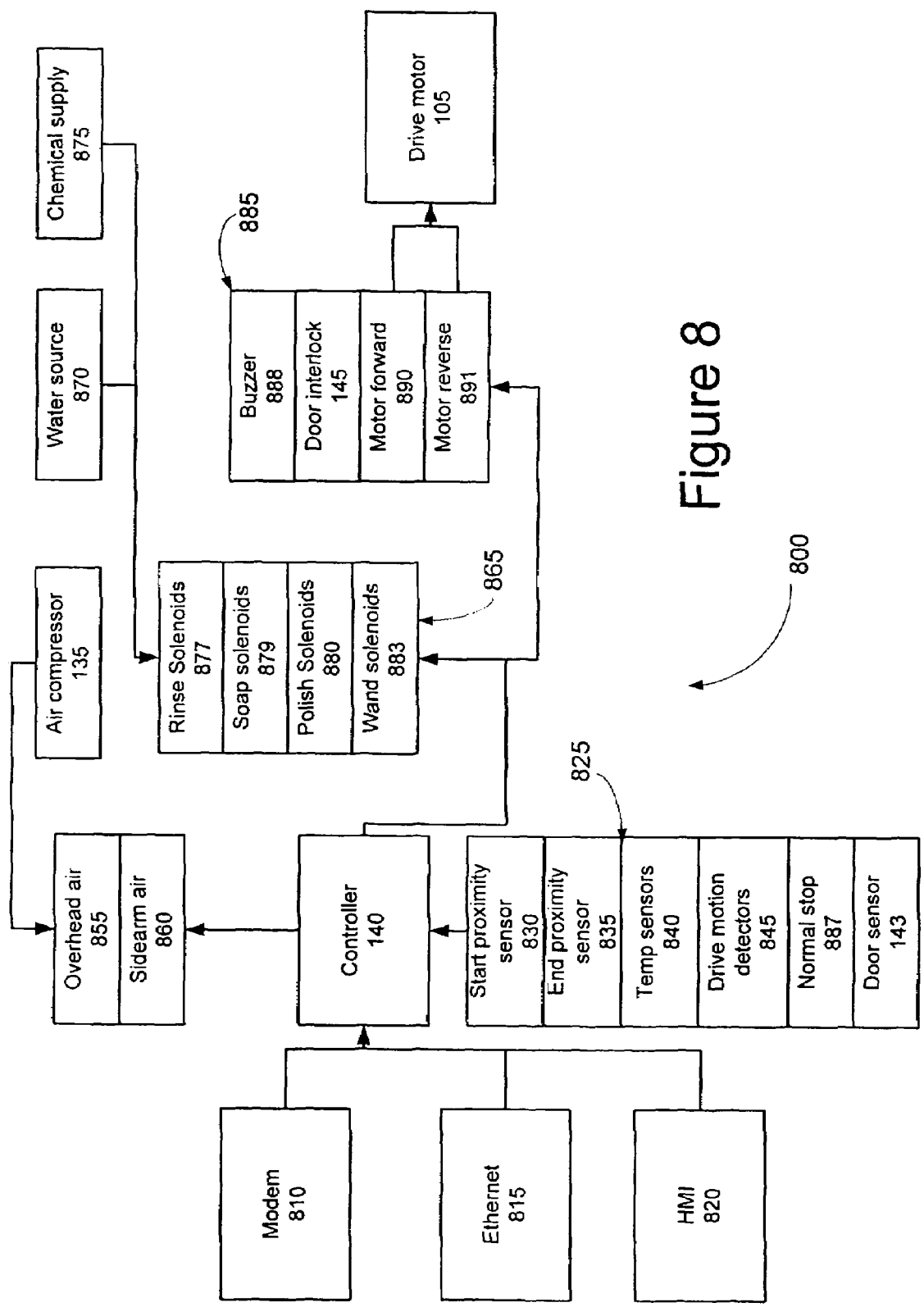
FIG. 8 illustrates one manner of implementing a control system that may be used to coordinate the operation of the various components of the system shown in FIG. 1.

FIG. 8 illustrates one manner of implementing a control system 800 that may be used to coordinate the operation of the various components of system 100. In the embodiment shown in FIG. 8, the control system 800 includes a controller 140 that, for example, may be in the form of a programmable logic controller, embedded processor, personal computer, or the like. Communications between system 800 and a network or other systems may take place using a modem 810 and/or an ethernet interface 815. Interaction between a user and system 800 may take place using a human machine interface 820, which may include a keyboard, display, mouse, touchscreen, and/or other human interface devices.

Controller 140 receives signals indicative of the system environment and operating limits from a plurality of sensors 825. Such sensors may include start and end proximity sensors 830 and 835 that indicate when the carriage assembly 103 has reached a start position and end position, respectively. Temperatures sensors 840 may provide signals indicative of the temperature in various portions of the system 100. For example, one or more temperature probes may be disposed to monitor the ambient temperature of the system environment, the temperature(s) of certain system fluids (rinsing solution, soap, water, polish), as well as drive motor temperature. As a result, the user may be warned when it is either too hot or too cold to operate system 100. Still further, sensors 825 may include one or more drive motion detectors 845 indicative of the motion of carriage 103 and/or the motion of drives 325 and/or drives 410.

Controller 140 also may be used to operate drives 325 and 410. If drives 325 and 410 are implemented as pneumatic drives, each drive may be provided with compressed air from an air compressor 135. The compressed air may be selectively provided to drives 325 and 410 via corresponding valves and/or solenoids 855 and 860.

Cleaning fluids may be provided to the nozzles 117, rinse bar 120, and wand 155 from water source 870 and chemical supply 875 through actuation of corresponding solenoids 865. In the illustrated system 800, solenoids 865 are place under the control of the controller 140 and may include rinse solenoids 877, soap solenoids 879, polish solenoids 880, and wand solenoids 883.

Controller 140 also may be connected to actuate a number of additional components shown generally at 885. Such components 885 may include an actuator 887 to execute a normal stop operation, a buzzer actuator 888 to sound an alarm buzzer, and a door interlock actuator 145 to engage the door interlock mechanism. Still further, forward and reverse motor actuators 890 and 891 may be employed to control the motion of the motor 105 for driving of the carriage 103.

Figure 9:
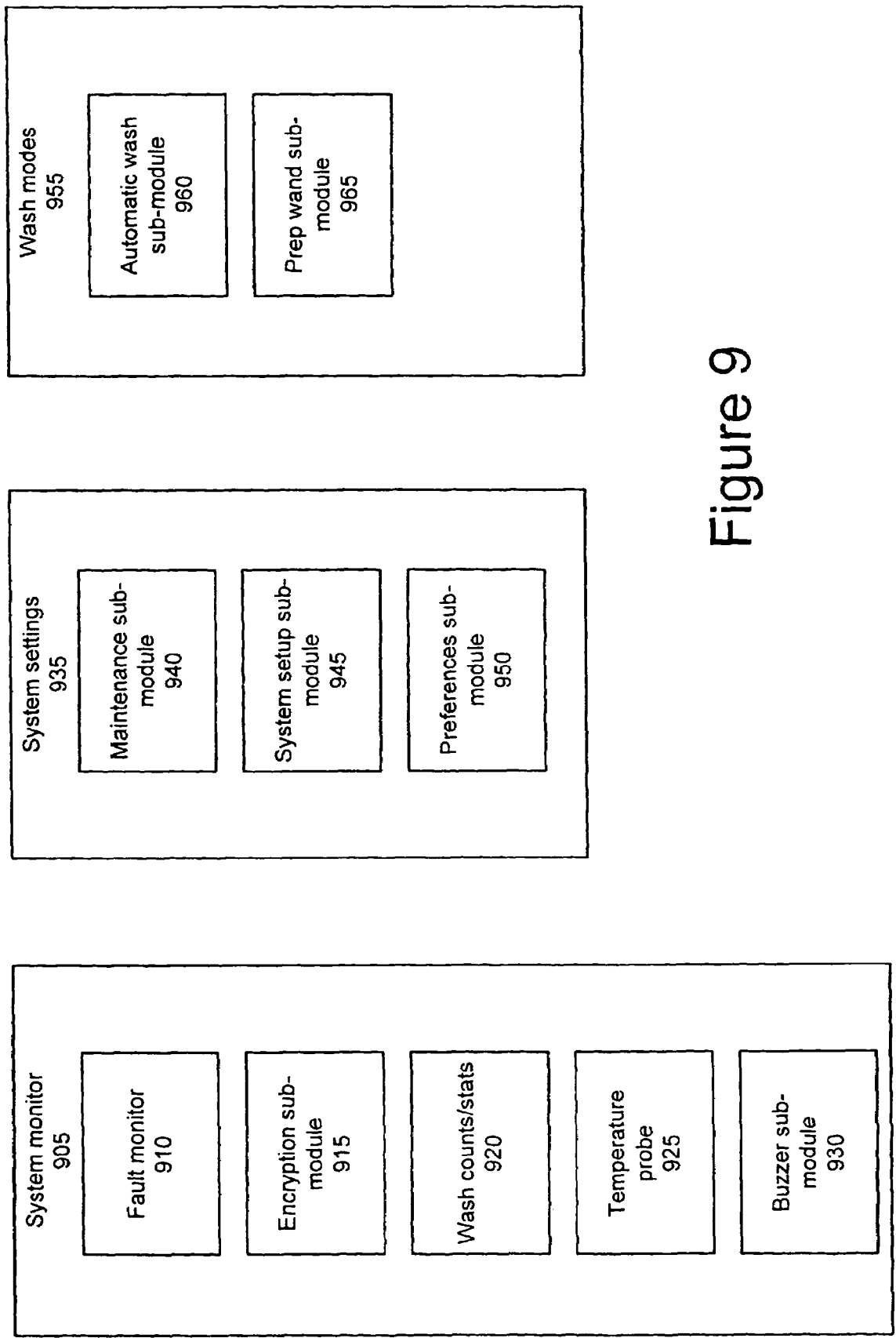
FIG. 9 illustrates some of the software/processing modules that may be employed in the system shown in FIG. 8 to implement various vehicle wash functions.

FIG. 9 illustrates some of the software/processing modules that may be employed in the system shown in FIG. 8 to implement various vehicle wash functions. As shown, the modules may include a system monitor module 905 that may be used to monitor wash input activity and direct wash control based on user and sensor inputs. The system module monitor may include a number of sub-modules including a fault monitor 910, an encryption sub-module 915, a wash count/stats sub-module 920, a temperature probe sub-module 925, and a buzzer sub-module 930.

The sub-modules may be used to implement a number of different operations. For example, the fault monitor 910 may be used to scan for various sensor or condition faults including temperature, garage door position (up/down), low soap/chemical levels, incorrect wash code, obstructions in wash path, wash position on rails (home/rear/front), air/water pressure, and the like. The encryption sub-module 915 may be employed to monitor user entry of access codes that allow the user to access protected areas of wash programming such as encryption setup, first-time wash setup, and/or when new options are added to the wash system and need to be activated. An initial password may be supplied by an installer and/or manufacturer.

The wash count/stats sub-module 920 may be used to monitor wash counts and statistics. For example, the sub-module 920 may maintain tallies and logs statistics related to wash usage and functions such as wash type, wash frequency, system faults, chemical/utility consumption, and the like.

The temperature probe sub-module 925 may be used to interact with any temperature probes employed in the system. For example, sub-module 925 may be used to monitor ambient and/or fluid temperatures and to trigger a buzzer through buzzer sub-module 930 when temperature limits are exceeded (i.e. low temperatures, overheating, etc.) Operating the wash system in below freezing temperatures may cause damage to wash components. The buzzer may be operated to sound when the wash system is activated in low-temperature conditions to alert the user of the condition. Manual override may be required to continue with wash operations under such conditions.

The system monitor module 905 may scan for input of user-defined wash activation codes. When a recognized activation code is entered and detected, further options may be presented to the user. Some of these options may be associated with a system settings module 935. In the illustrated example, the system settings module includes a maintenance sub-module 940, a system setup sub-module 945, and a preferences sub-module 950.

The maintenance sub-module 940 may be used to provide access to network/modem settings, system diagnostics, titration settings, and to enable (activate) options. A network and/or modem connection settings menu may allow the user to modify settings used to connect the wash control system 800 to a computer network. These connections also may be used to update software, remotely monitor the wash operation, review data logs and statistics, activate options, and/or troubleshoot. A system diagnostics menu may include options that allow the user to manually access select wash outputs to verify the functionality of components outside of normal wash processes. A titration options menu may be accessed to allow the user to control titration of chemicals for altering wash performance by controlling spray functions of the wash system outside of normal wash process. A general options menu may be used to allow the user to enable (activate) and/or disable (deactivate) wash options. This may include activating/deactivating existing wash options or activating added wash options such as reverse osmosis (RO) spot free water application, an undercarriage spray add-on, a dryer add-on, a spot-free rinse add-on, a prep wand add-on, and the like.

The system setup sub-module 945 may be used to provide access system operation parameters that alter various wash performance and functional characteristics of the wash system. For example, sub-module 945 may include a clock options menu that allows the user to set the system clock. A wash timers option menu may provide the user with access to set up timer parameters for various wash functions, including carriage distance movement, soap timer, rinse timer, and carriage speed. These options may be customized for each of several multiple programmed wash packages. For each such package, the user may enter the following options:

1. Distance—This measurement corresponds to the distance from the front wash position to the front of the vehicle and from the rear wash position to the rear of the vehicle. This measurement may be used to set timers within the programming that tell the wash how far it needs to travel to reach set points in the wash process.
2. Soap—This timer may be used to determine how long the soap stays on during the wash process. Adjusting this timer allows the user to alter the efficiency of the wash process as well as to implement a pre-wash time for bug removal at the front of the vehicle during the wash process.
3. Rinse—This timer may be used to determine how long the rinse stays on during the wash process.
4. Speed—This timer may be used to adjust the overall duration of the wash process.
5. Temperature Calibration—This setting may be used to allow the user to calibrate the temperature probe.

The preferences sub-module 950 may provide user access to various settings to alter basic user preference settings. For example, a miscellaneous menu may be employed to enable or disable miscellaneous wash function, such as automatic software updates, water saver mode, and dryer functions. A front/rear home menu may be used to allow the user to set the wash home position at the front or rear of the car to suit garage setup and preference. A buzzer menu may be provided to allow the user to disable or enable the buzzer. Further, a door interlock menu may be employed to allow the user to enable or disable one or more system interlocks. For example, a door interlock may be used to prevent the garage door from opening when a wash cycle is in process.

The wash modes module 955 may be used to prompt the user to select an automatic wash, executed using the automatic wash sub-module 960, or a prep wand mode, executed using the prep wand mode sub-module 965. When an automatic wash is selected, the user may be presented with a menu from which one of a plurality of pre-programmed washes may be selected. Each of the pre-programmed washes may be associated with its own unique set of parameters. This allows a single system to accommodate multiple vehicles of different sizes, etc., as well as multiple wash types (light wash, wash and polish, etc.)

In the prep wand mode, the user may elect to enable or disable various wand parameters. For example, the user may enable or disable the automatic shutoff of the wand after a set time has elapsed. The type of fluid dispensed during wand operation also may be selected in this mode. To this end, the user may elect to have rinse water, soapy fluid, and/or polish applied by the wand during the wand mode.

Figure 10:
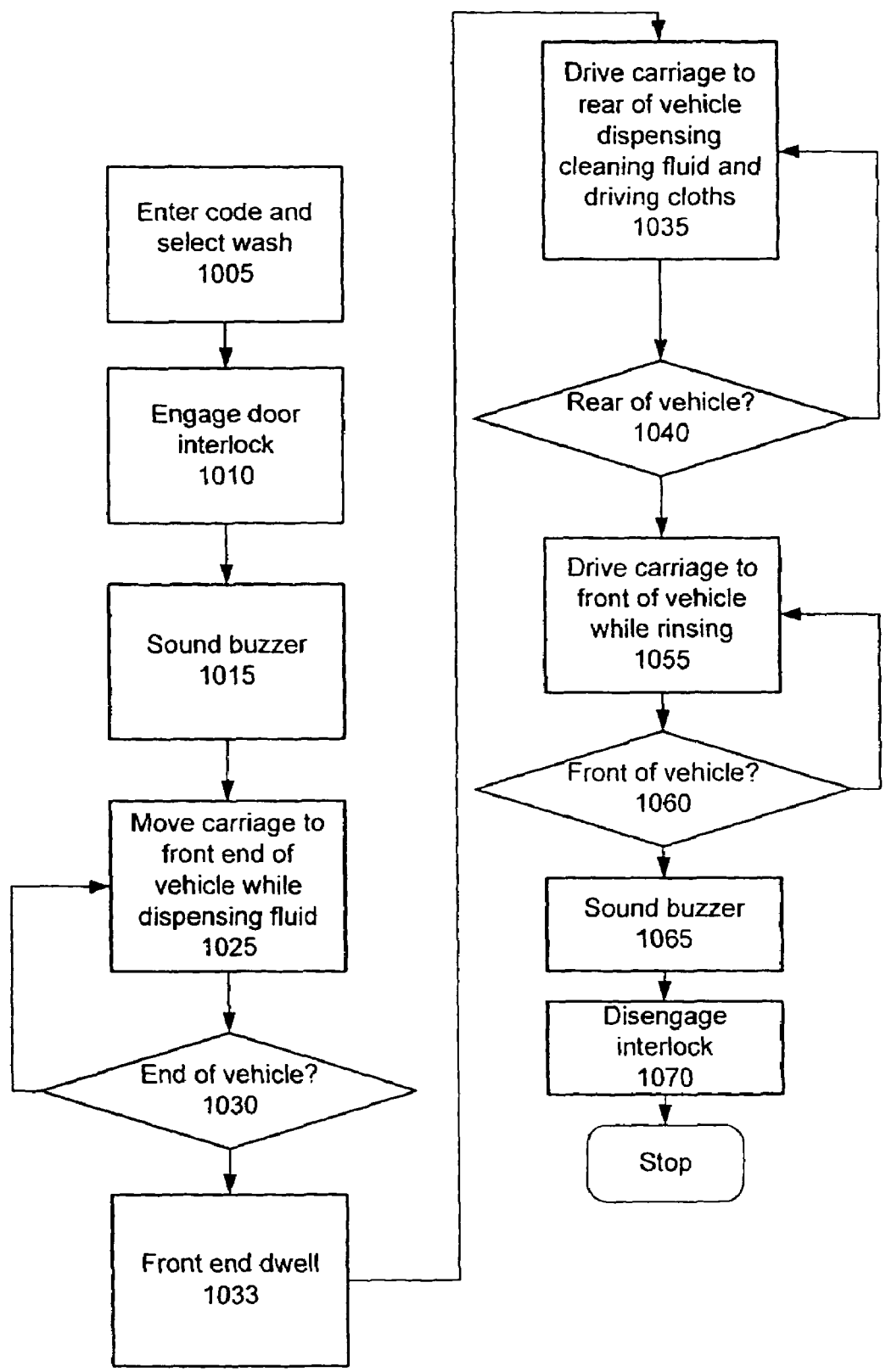
FIG. 10 is a flowchart showing a plurality of interrelated operations that may be executed to implement a wash operation using the system of FIG. 1.

FIG. 10 is a flowchart showing a plurality of interrelated operations that may be executed to implement a wash operation using the system 100 of FIG. 1. As illustrated, the user enters a user code to access the system and selects the appropriate wash program at block 1005. The door interlock mechanism 145 may be engaged in the operation at block 1010 and the buzzer may be sounded at block 1015 to signal the start of the wash operation.

A rinse and/or cleaning fluid is dispensed on the vehicle as the carriage 103 and arm 120 are moved from a start position toward the front of the vehicle in the operation shown at block 1025. The carriage 103 and arm 120 are moved toward the front of the vehicle until the operation at block 1030 indicates that the carriage and arm have reached the front of the vehicle. A front end dwell operation may be introduced at block 1033 to facilitate additional cleaning of the front end (i.e., insect wash).

At block 1035, the carriage 103 may be driven to the rear of the vehicle while concurrently dispensing cleaning fluid and driving the cloths in a reciprocating manner to wash the vehicle. This cleaning operation may be continued until the end of the vehicle is reached as detected in the operation show at block 1040. The carriage 103 may be driven at block 1055 while dispensing a rinsing fluid until the operation at block 1060 detects that the carriage 103 has arrived at the front of the vehicle. The buzzer is again sounded at block 1065 to signal the end of the wash cycle and the door interlock is disengaged at block 1070.

The operations shown in FIG. 10 illustrate merely one manner of executing a wash operation and significant variations may be implemented using the electronic system 800 in conjunction with the mechanical system shown in FIG. 1 given the flexibility provided by the combination of these systems. For example, certain operations, such as the pre-soak and polish operations, may be omitted from the wash cycle. Still further, certain operations, such as an undercarriage wash or blow dry operation may be added using the appropriate hardware and software.

Other operations that may be executed during the wash operation cycle shown in FIG. 10 that are not necessarily expressly shown include operations associated with the various modules of FIG. 9. Such operations may include:

1. Monitoring I/O states—the software may scan the system inputs for fault conditions and will alert the user if conditions are not suitable to perform a wash and/or take preventative measures to reduce damage to the equipment, such as purging cleaning fluids.
2. Verification of carriage position—the software may verify that the carriage 103 is in the home position (front or rear, depending on user settings) before continuing the wash process.
3. Verification that the garage door is closed—the software may verify that the garage door is closed before continuing the wash process.
4. Verification of the cloth positions—the software may verify the location of the overhead and side arm cloths before continuing the wash process. This allows the wash to coordinate movement of the side arm and overhead drives.
5. Monitor drive motor—the software may monitor the carriage drive 105 to verify motor drive position and function.
6. Rinse preparation—the software may direct rinse water to wet the vehicle, overhead cloth, and side arm cloths in preparation for wash process.
7. Pause at vehicle front and/or rear for additional wash—the software may direct the carriage to pause at the front and/or rear of the vehicle for a user-set time for extra cleaning. This may be preferred by the user to, for example, remove bugs from the front of the vehicle.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A vehicle wash system for use in a building having a vehicle access door comprising:
    a main carriage that is movable along a length of a vehicle that is to be washed;
    a carriage drive system disposed to move the main carriage along the length of the vehicle that is to be washed;
    a plurality of nozzles disposed for co-movement with the main carriage;
    a sidearm drive system comprising a rod attached to the main carriage by at least one connection member and a linear drive having a first end connected to the main carriage and a second end connected to a linkage operable to convert the linear motion of the drive to rotate the rod, the linear drive being reversible such that the sidearm drive system rotates the sidearm cloth in a reciprocating manner for contact with a side portion of the vehicle; and
    a control system disposed to control operation of the sidearm drive system and the carriage drive system; and
    an interlock mechanism inhibiting operation of the vehicle wash system when the vehicle access door is in an open state.

2. The vehicle wash system of claim 1, where the sidearm cloth is rotated along an arc that is less than about 180°.

3. The vehicle wash system of claim 1, where the sidearm cloth has a contour that is adapted to generally correspond to a side contour of the vehicle that is to be washed.

4. The vehicle wash system of claim 1, further comprising a further sidearm cloth disposed for reciprocating rotation by the sidearm drive system for contact with a side portion of the vehicle.

5. The vehicle wash system of claim 4, further comprising a sidearm adjustment mechanism disposed to allow adjustment of a distance of separation between the sidearm cloth and the further sidearm cloth.

6. The vehicle wash system of claim 1, where the main carriage comprises a pair of spaced apart vertical support arms connecting the main carriage to one or more carriage drive tracks.

7. The vehicle wash system of claim 1, further comprising a plumbing manifold system providing one or more cleaning fluids to the one or more nozzles.

8. The vehicle wash system of claim 1, where the vehicle wash system further comprises an interlock mechanism inhibiting opening of the vehicle access door when the vehicle wash system is operating to wash a vehicle.

9. The vehicle wash system of claim 1, further comprising a temperature monitoring system providing temperature information to the control system, where the control system inhibits operation of the vehicle wash system in response to a monitored temperature falling below a threshold value.

10. The vehicle wash system of claim 9, where the monitored temperature is a temperature of at least one of the one or more liquids provided to the one or more nozzles.

11. The vehicle wash system of claim 9, where the monitored temperature is an ambient temperature of an environment of the vehicle wash system.

12. A vehicle wash system for use in a building having a vehicle access door comprising:
    a main carriage that is movable along a length of a vehicle that is to be washed;
    one or more nozzles disposed for co-movement with the main carriage;
    a sidearm drive system on each side of the main carriage disposed for co-movement with the main carriage each sidearm drive system comprising a rod attached to the main carriage by at least one connection member and a linear drive having a first end connected to the main carriage and a second end connected to a linkage, the linkage being operable to convert the linear motion of the drive to rotate the rod, the linear drive being reversible such that the sidearm drive system rotates a pair of sidearm cloths in a reciprocating manner for contact with side portions of the vehicle
    a control system disposed to control operation of the main carriage movement and sidearm drive system; and
    an interlock mechanism inhibiting opening of the vehicle access door when the vehicle wash system is operating to wash a vehicle.

13. The vehicle wash system of claim 12, where the sidearm cloths are each rotated along an arc that is less than about 180°.

14. The vehicle wash system of claim 12, where the sidearm cloths have a contour that is adapted to generally correspond to a side contour of the vehicle that is to be washed.

15. The vehicle wash system of claim 12, further comprising at least one overhead cloth drive system disposed for co-movement with the main carriage, where the overhead cloth drive system moves an overhead cloth in a reciprocating manner for contact with an upper portion of the vehicle.

16. The vehicle wash system of claim 15, where the overhead cloth comprises a plurality of vertically stepped sections.

17. The vehicle wash system of claim 12, further comprising at least one adjustment mechanism disposed to allow adjustment of a distance of separation between the sidearm cloths to thereby accommodate vehicles of differing widths.

18. The vehicle wash system of claim 12, where the main carriage comprises a pair of spaced apart vertical support arms connecting the main carriage to one or more carriage drive tracks.

19. The vehicle wash system of claim 12, further comprising a carriage drive system disposed to move the main carriage along the length of the vehicle that is to be washed.

20. The vehicle wash system of claim 19, further comprising a plumbing manifold system providing one or more cleaning fluids to the one or more nozzles.

21. The vehicle wash system of claim 12, further comprising a temperature monitoring system providing temperature information to the control system, where the control system inhibits operation of the vehicle wash system in response to a monitored temperature falling below a threshold value.

22. The vehicle wash system of claim 21, where the monitored temperature is a temperature of at least one of the one or more cleaning fluids provided to the one or more nozzles.

23. The vehicle wash system of claim 21, where the monitored temperature is an ambient temperature of an environment of the vehicle wash system.

24. A vehicle wash system for use in a building having a vehicle access door comprising:
   a main carriage that is movable along a length of a vehicle that is to be washed;
   a carriage drive system disposed to move the main carriage along the length of the vehicle that is to be washed;
   a plurality of nozzles disposed for co-movement with the main carriage;
   a sidearm drive system disposed for co-movement with the main carriage comprising a rod attached to the main carriage by at least one connection member, the rod being permitted to rotate and a linear drive having a first end connected to the main carriage and a second end connected to a linkage, the linkage being operable to convert the linear motion of the drive to rotate the rod and a sidearm cloth for contact with a side portion of the vehicle;
   a control system disposed to control operation of the carriage drive system and sidearm drive system; and
   a temperature monitoring system providing temperature information to the control system, where the control system inhibits operation of the vehicle wash system in response to a monitored temperature falling below a threshold value.

25. The vehicle wash system of claim 24, where rotation of the sidearm cloth is less than about 180°.

26. The vehicle wash system of claim 24, where the sidearm cloth has a contour that is adapted to generally correspond to a side contour of the vehicle that is to be washed.

27. The vehicle wash system of claim 24, further comprising a further sidearm cloth disposed for reciprocating rotation by the sidearm drive system for contact with a side portion of the vehicle.

28. The vehicle wash system of claim 27, further comprising a sidearm adjustment mechanism disposed to allow adjustment of a distance of separation between the sidearm cloth and the further sidearm cloth.

29. A vehicle wash system for use in a building having a vehicle access door comprising:
   a means for moving a main carriage along a length of a vehicle that is to be washed;
   nozzle means for dispensing a cleaning fluid, where the nozzle means is disposed for co-movement with the main carriage;
   sidearm cleaning drive comprising a rod attached to the main carriage by at least one connection member, a sidearm cloth attached to the rod, a linear drive having a first end connected to the main carriage and a second end connected to a linkage, the linkage being operable to convert the linear motion of the drive to rotate the rod and the sidearm cloth to clean a side portion of the vehicle through movement of at least one sidearm cloth, where the sidearm cleaning drive is disposed for co-movement with the main carriage;
   overhead cleaning means for cleaning an upper portion of the vehicle where the overhead cleaning means is disposed for co-movement with the main carriage;
   a control means for controlling operation of the sidearm cleaning means and the main carriage; and
   a means for inhibiting operation of the vehicle wash system when the vehicle access door is in an open state.

30. A vehicle wash system comprising:
   a main carriage that is movable along a length of a vehicle that is to be washed;
   one or more nozzles disposed for co-movement with the main carriage; and
   a sidearm drive system disposed for co-movement with the main carriage comprising a rod attached to the main carriage by at least one connection member, a sidearm cloth attached to the rod, a linear drive having a first end connected to the main carriage and a second end connected to a linkage, the linkage being operable to convert the linear motion of the drive to rotate the rod and the sidearm cloth, where the sidearm drive system rotates the sidearm cloth in a reciprocating manner along an arc less than about 180° for contact with a side portion of the vehicle.

31. The vehicle wash system of claim 30, further comprising a further sidearm drive system disposed for co-movement with the main carriage, where the sidearm drive system rotates a further sidearm cloth opposite the sidearm cloth in a reciprocating manner along an arc less than about 180° for contact with a side portion of the vehicle.

32. The vehicle wash system of claim 30, further comprising:
   a control system disposed to control movement of the main carriage and operation of sidearm drive system; and
   a temperature monitoring system providing temperature information to the control system, where the control system inhibits operation of the vehicle wash system in response to a monitored temperature falling below a threshold value.

33. The vehicle wash system of claim 32, where the monitored temperature is a temperature of at least one of the one or more cleaning fluids provided to the one or more nozzles.

34. The vehicle wash system of claim 32, where the monitored temperature is an ambient temperature of an environment of the vehicle wash system.

* * * * *